US012144768B2

(12) United States Patent
Torikai et al.

(10) Patent No.: US 12,144,768 B2
(45) Date of Patent: Nov. 19, 2024

(54) BOARDING/DEBOARDING CONTROLLER

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Hirotaka Torikai, Aichi-ken (JP); Junki Kato, Aichi-ken (JP); Akira Kaneko, Aichi-ken (JP); Kouichi Masamura, Aichi-ken (JP); Shushi Waseda, Aichi-ken (JP)

(73) Assignees: TOYOTA BOSHOKU KABUSHIKI KAISHA, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 941 days.

(21) Appl. No.: 17/088,050

(22) Filed: Nov. 3, 2020

(65) Prior Publication Data
US 2021/0145676 A1 May 20, 2021

(30) Foreign Application Priority Data
Nov. 15, 2019 (JP) ................. 2019-207062

(51) Int. Cl.
*A61G 5/14* (2006.01)
*B60N 2/16* (2006.01)
*B60N 2/24* (2006.01)

(52) U.S. Cl.
CPC ............. *A61G 5/14* (2013.01); *B60N 2/1615* (2013.01); *B60N 2002/247* (2013.01)

(58) Field of Classification Search
CPC .. A61G 5/14; B60N 2/1615; B60N 2002/247; B60N 2/0256; B60N 2/0224; B60N 2/161
See application file for complete search history.

(56) References Cited

U.S. PATENT DOCUMENTS 4,796,943 A * 1/1989 Fukutomi ................ B60J 7/148
296/117
7,255,399 B2 * 8/2007 White .................. B60N 2/3088
296/65.09
(Continued)

FOREIGN PATENT DOCUMENTS

JP        62-94418      4/1987
JP        63-70429 U    5/1988
(Continued)

OTHER PUBLICATIONS

English Translation of JPH04189634-A (Year: 2023).*
(Continued)

*Primary Examiner* — Rami Khatib
*Assistant Examiner* — Gabriel Joseph Rene Lambert
(74) *Attorney, Agent, or Firm* — Greenblum & Bernstein, P.L.C.

(57) ABSTRACT

Provided is a boarding/deboarding controller that enables reduce time and effort for boarding and deboarding a vehicle of which canopy is opened or closed to allow a user boards or deboards. One aspect of the present disclosure provides a boarding/deboarding controller for a vehicle including a seat, an occupant compartment provided with the seat, and a canopy that moves to a closed position where the canopy covers the occupant compartment and to an opened position, which is situated upper than the closed position. The boarding/deboarding controller is configured to change a posture or position of the seat concurrently while the canopy is moved from the closed position to the opened position in an opened movement, or, from the opened position to the closed position in a closed movement.

7 Claims, 6 Drawing Sheets

(56) References Cited

U.S. PATENT DOCUMENTS

| | | | |
|---|---|---|---|
| 9,707,866 B2* | 7/2017 | Mayer | B60N 2/2352 |
| 10,632,868 B2* | 4/2020 | Fitzpatrick | B60N 2/10 |
| 10,988,052 B2* | 4/2021 | Takamatsu | B60N 2/18 |
| 11,167,672 B2* | 11/2021 | Hoshi | B60N 2/5657 |
| 2002/0017797 A1* | 2/2002 | Jach | B60N 2/045 |
| | | | 296/65.09 |
| 2004/0256901 A1* | 12/2004 | Nakaya | B60N 2/309 |
| | | | 297/378.1 |
| 2006/0061183 A1* | 3/2006 | White | B60N 2/3077 |
| | | | 297/378.12 |
| 2007/0241600 A1* | 10/2007 | Laux | B60N 2/3011 |
| | | | 297/331 |
| 2007/0252404 A1* | 11/2007 | Muck | B60N 2/3065 |
| | | | 296/65.16 |
| 2011/0266855 A1* | 11/2011 | Zimmerman, II | B60N 2/986 |
| | | | 297/378.1 |
| 2012/0061985 A1* | 3/2012 | Parker | B60J 5/104 |
| | | | 296/136.03 |
| 2012/0169099 A1* | 7/2012 | Horiguchi | B60N 2/164 |
| | | | 297/314 |
| 2016/0144748 A1* | 5/2016 | Akutsu | B60N 2/43 |
| | | | 297/341 |
| 2016/0318422 A1* | 11/2016 | Thomas | B60N 2/3086 |
| 2017/0080831 A1* | 3/2017 | Kaemmerer | B60N 2/305 |
| 2017/0217335 A1* | 8/2017 | Tominaga | B60N 2/0228 |
| 2018/0126876 A1* | 5/2018 | Takamatsu | B60N 2/0292 |
| 2018/0201162 A1* | 7/2018 | Sasaki | B60N 2/2222 |
| 2018/0281634 A1* | 10/2018 | Furukawa | B60N 2/3011 |
| 2019/0106038 A1* | 4/2019 | Rose | B60N 2/0244 |
| 2019/0143936 A1* | 5/2019 | Abel Rayan | B60R 25/2054 |
| | | | 701/2 |
| 2020/0139851 A1* | 5/2020 | Oshima | B60N 2/0252 |
| 2020/0189419 A1* | 6/2020 | Lee | B60N 2/06 |
| 2021/0069521 A1* | 3/2021 | Lee | B60N 2/02246 |
| 2021/0101509 A1* | 4/2021 | Hoshi | B60N 2/5628 |
| 2021/0114487 A1* | 4/2021 | Han | B60N 2/1814 |
| 2023/0038920 A1* | 2/2023 | Mizoi | G01B 11/26 |

FOREIGN PATENT DOCUMENTS

| | | | |
|---|---|---|---|
| JP | 01-131616 U | 9/1989 | |
| JP | 04-189634 | 7/1992 | |
| JP | H04189634 A * | 7/1992 | B60N 2/16 |
| JP | 2007210542 A * | 8/2007 | B60J 5/04 |
| JP | 2010-163112 | 7/2010 | |
| JP | 2014-113907 | 6/2014 | |

OTHER PUBLICATIONS

English Translation of JP-2007210542-A (Year: 2023).*
Japan Office Action issued in Japan Patent Application No. 2019-207062, dated Feb. 28, 2023, together with English translation thereof.
China Office Action issued in China Patent Application No. 202011260452.5, dated Mar. 27, 2023, together with English translation thereof.

* cited by examiner

BOARDING/DEBOARDING CONTROLLER

CROSS-REFERENCE TO RELATED APPLICATIONS

This application claims the benefit of Japanese Patent Application No. 2019-207062 filed on Nov. 15, 2019 with the Japan Patent Office, the entire disclosure of which is incorporated herein by reference.

BACKGROUND

The present disclosure relates to a boarding/deboarding controller.

In a vehicle such as an automobile, there has been known a canopy that is opened and closed above a seat disposed in an occupant compartment (see Japanese Unexamined Patent Application Publication 2010-163112). In a vehicle provided with a canopy, a user sometimes boards or deboards while the canopy is opened, in such a manner that the user gets over a side wall of the vehicle.

SUMMARY

When the user boards or deboards in the manner that the user gets over the side wall of the vehicle as the described above, the user may have a difficulty in boarding or deboarding depending on a seat position. In light of the above, the seat position needs to be adjusted corresponding to boarding or deboarding by the user.

When deboarding the vehicle, the user is required to perform an operation to open the canopy and anther operation to move the seat to a position where the user easily deboards after opening the canopy. Also, when boarding the vehicle, the user is required to perform an operation to move the seat to a driving position after sitting on the seat and an operation to close the canopy. Consequently, the user is required to spend time and effort boarding and deboarding the vehicle.

In one aspect of the present disclosure, it is preferable to provide a boarding/deboarding controller that can reduce time and effort for boarding and deboarding a vehicle of which canopy is opened or closed to allow a user to board or deboard.

One aspect of the present disclosure provides a boarding/deboarding controller for a vehicle including a seat, an occupant compartment provided with the seat, and a canopy that moves to a closed position where the canopy covers the occupant compartment and to an opened position, which is situated upper than the closed position. The boarding/deboarding controller is configured to change a posture or position of the seat concurrently while the canopy is moved from the closed position to the opened position in an opened movement, or, from the opened position to the closed position in a closed movement.

With this configuration, when the user deboards the vehicle, or when the user boards the vehicle, the canopy and the seat can be moved to positions where the user easily boards or deboards in a single operation. The movement of the canopy and the change in posture or position of the seat are concurrently performed, whereby the time for boarding and/or deboarding can be reduced.

In one aspect of the present disclosure, the seat may include a seat body and a seat lifter device for moving the seat body along an up-down axis. The boarding/deboarding controller may be configured to raise or lower the seat body by using the seat lifter device concurrently while the canopy is in the opened movement or the closed movement. With this configuration, the seat body can be raised to a height where the user easily boards or deboards.

In one aspect of the present disclosure, the boarding/deboarding controller may be configured to drive the seat lifter device so as to raise the seat body when the canopy reaches a predetermined opening degree while the canopy is in the opened movement. With this configuration, the opened movement of the canopy and a rise of the seat body can be concurrently performed, while an interference between the canopy and the seat and a collision between the canopy and the user are suppressed.

In one aspect of the present disclosure, the boarding/deboarding controller may be configured to drive the seat lifter device so as to lower the seat body, and to command the closed movement of the canopy when the seat body reaches a predetermined height. With this configuration, the closed movement of the canopy and a lowering of the seat body can be concurrently performed, while an interference between the canopy and the seat and a collision between the canopy and the user are suppressed.

In one aspect of the present disclosure, the seat body may include a seat cushion and a seatback. The seat may include a reclining device for pivoting the seatback in a direction of a seat front-rear axis relative to the seat cushion. The boarding/deboarding controller may be configured to pivot the seatback by using the reclining device concurrently while the canopy is in the opened movement or the closed movement. With this configuration, a tilt of the seatback is changed while a height of the seat is changed, whereby a cramped posture of the user sitting on the seat can be inhibited.

In one aspect of the present disclosure, the boarding/deboarding controller may be configured to drive the seat lifter device so as to raise the seat body and to simultaneously drive the reclining device so as to pivot the seatback in a rearward direction, while the canopy is in the opened movement. This configuration allows a distance between a head of the user sitting on the seat and the canopy. Consequently, an oppressive feeling on the user can be reduced.

In one aspect of the present disclosure, the seat may include the seat body and a sliding device for sliding the seat body along the seat front-rear axis. The boarding/deboarding controller may be configured to slide the seat body by using the sliding device concurrently while the canopy is in the opened movement or the closed movement. With this configuration, the seat body can be moved to a position where the user easily boards or deboards.

BRIEF DESCRIPTION OF THE DRAWINGS

Hereinafter, the present disclosure will be described by way of example with reference to the accompanying drawings, in which.

DETAILED DESCRIPTION OF EXEMPLARY EMBODIMENTS

1. First Embodiment

1-1. Configuration

Figure 1A:
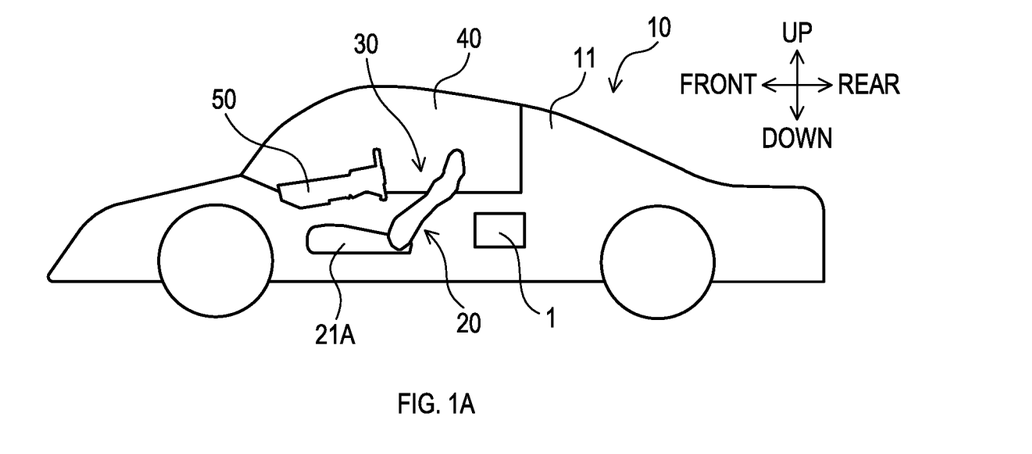
FIG. 1A is a schematic diagram of a vehicle according to an embodiment.
Figure 1B:
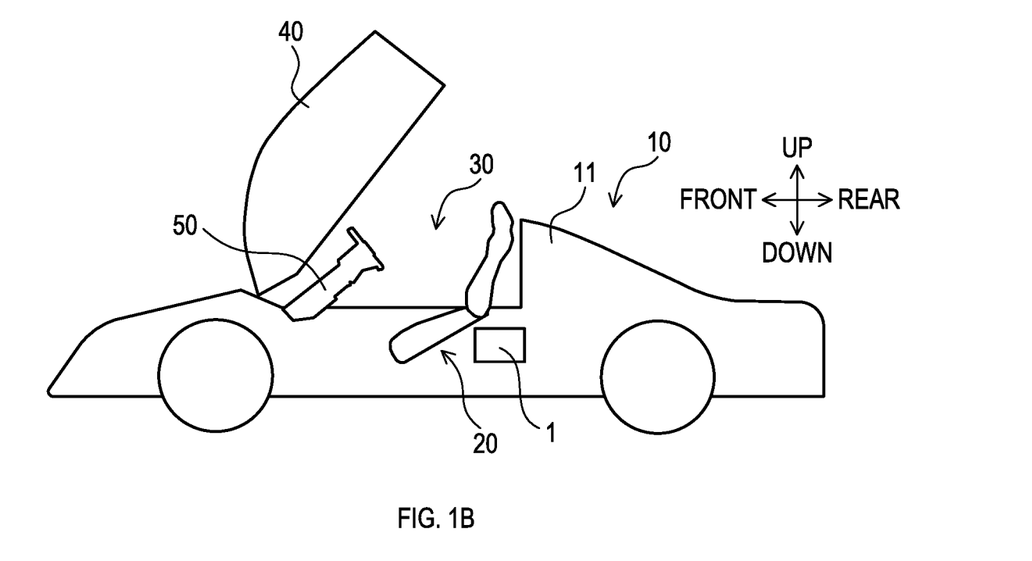
FIG. 1B is a schematic diagram illustrating a state where a canopy is positioned at an open position in the vehicle in FIG. 1A.

A vehicle 10 shown in FIGS. 1A and 1B includes: a body 11; a seat 20; an occupant compartment 30; a canopy 40; a steering column 50; and a boarding/deboarding controller 1. In the present embodiment, the vehicle 10 is a vehicle that travels on the ground.

<Occupant Compartment>

The occupant compartment 30 is a space provided inside of the body 11 for a user (a driver or a passenger) to stay therein. The seat 20 and the steering column 50 are disposed in the occupant compartment 30. The occupant compartment 30 is opened at a top.

<Canopy>

The canopy 40 is moved to a closed position where the canopy 40 covers the occupant compartment 30 (see FIG. 1A), and to an opened position, which is situated upper than the closed position (see FIG. 1B).

A front part of the canopy 40 is pivotably coupled to the body 11. The canopy 40 pivots about an axis parallel to a left-right axis of the vehicle 10 in a direction of an up-down axis. The canopy 40 is moved by an actuator driven by electric, pneumatic, hydraulic, or another energy.

The closed position is a position where the canopy 40 seals the occupant compartment 30 of the vehicle 10 together with the body 11. The canopy 40 positioned at the closed position closes an opening of the occupant compartment 30. The opened position is a position where the canopy 40 does not restrict entry or exit of the user into or from the occupant compartment 30 (specifically, boarding or deboarding).

<Steering Column>

An operating apparatus, such as a steering is attached to the steering column 50. The steering column 50 is positioned above a seat cushion 21A when the seat 20 is located at a driving position.

A front end portion of the steering column 50 is pivotably coupled to the body 11. The steering column 50 pivots about an axis parallel to the left-right axis of the vehicle 10 in the direction of the up-down axis. The steering column 50 is moved along the up-down axis by a column riser including an actuator driven by electric, pneumatic, hydraulic, or another energy.

<Seat>

Figure 2:
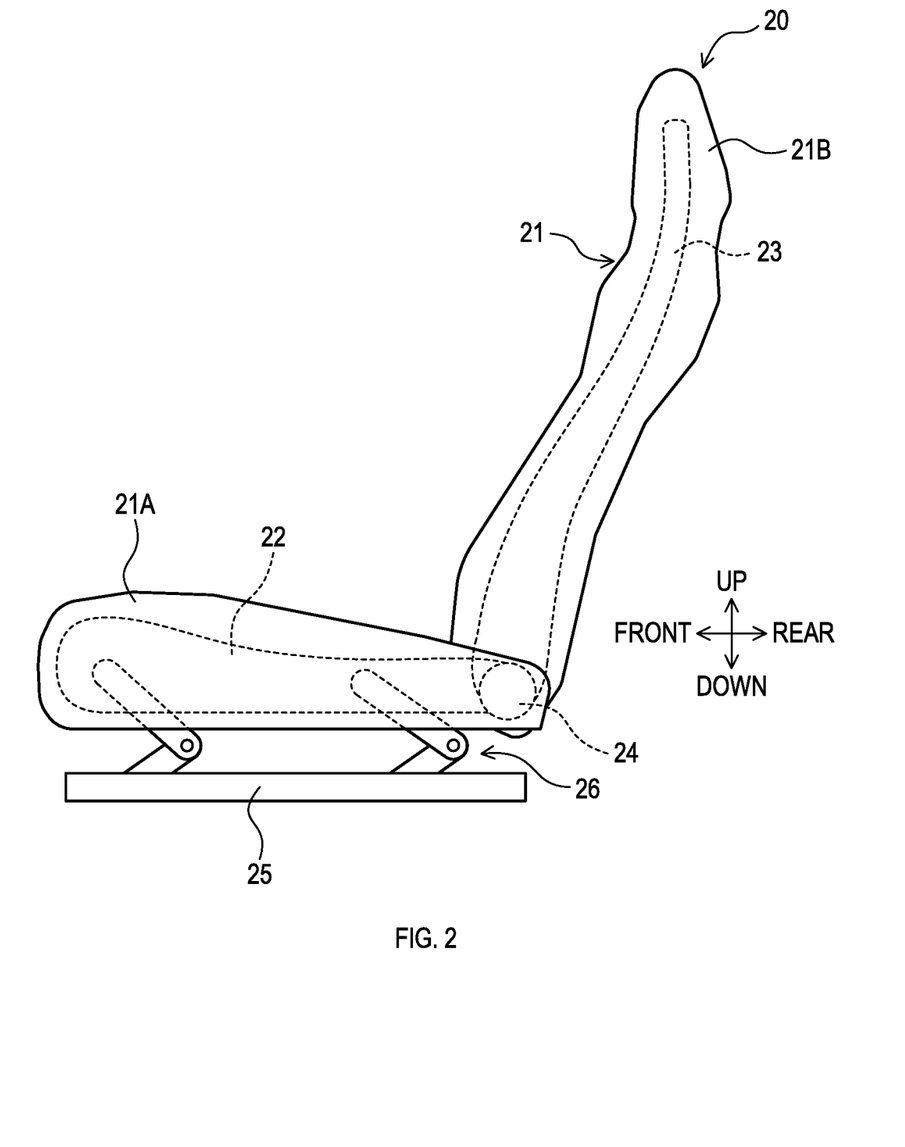
FIG. 2 is a schematic diagram of a seat in the vehicle in FIG. 1A.

The seat 20 includes: a seat body 21; a cushion frame 22; a back frame 23; a reclining device 24; a sliding device 25; and a seat lifter device 26, as shown in FIG. 2.

The seat body 21 includes the seat cushion 21A and a seatback 21B. A seat-width axis of the seat body 21 corresponds to the left-right axis of the vehicle 10, and a seat front side corresponds to a front side of the vehicle 10.

The seat cushion 21A supports the buttocks of an occupant. The seatback 21B supports the back of the occupant.

The cushion frame 22 is a member for supporting the seat cushion 21A. The back frame 23 is a member for supporting the seatback 21B.

The reclining device 24 allows the seatback 21B to pivot in a direction of a seat front-rear axis relative to the seat cushion 21A. The reclining device 24 allows the back frame 23 and the seatback 21B to pivot by using an actuator driven by electric, pneumatic, hydraulic, or another energy.

The sliding device 25 slides the seat body 21 along the seat front-rear axis. The sliding device 25 includes a movable rail coupled to the cushion frame 22 via the seat lifter device 26 and a fixed rail fixed to the body 11. The sliding device 25 slides the movable rail relative to the fixed rail along the seat front-rear axis by using an actuator driven by electric, pneumatic, hydraulic, or another energy.

The seat lifter device 26 moves the seat body 21 along the up-down axis. The seat lifter device 26 is disposed between the cushion frame 22 and the sliding device 25. The seat lifter device 26 includes: a driving link 26A; a pin 26B; a locking member 26C; and a shaft 26D, as shown in FIGS. 3A, 3B and 3C.

The driving link 26A is rotatably coupled to each of the cushion frame 22 and the sliding device 25. The seat cushion 21A is raised and lowered in response to rotation of the driving link 26A. The pin 26B is fixed to the driving link 26A and extends along the seat-width axis.

Figure 3A:
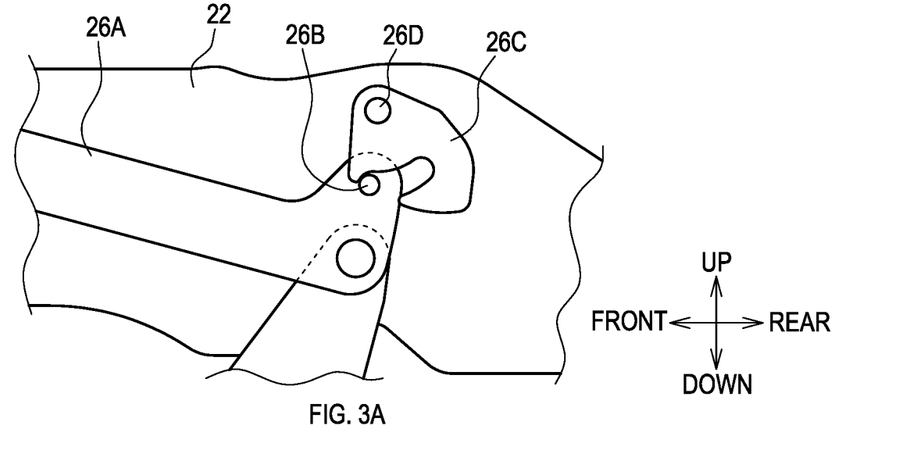
FIG. 3A is a schematic diagram illustrating a state where a driving link in the seat of FIG. 2 is locked.
Figure 3B:
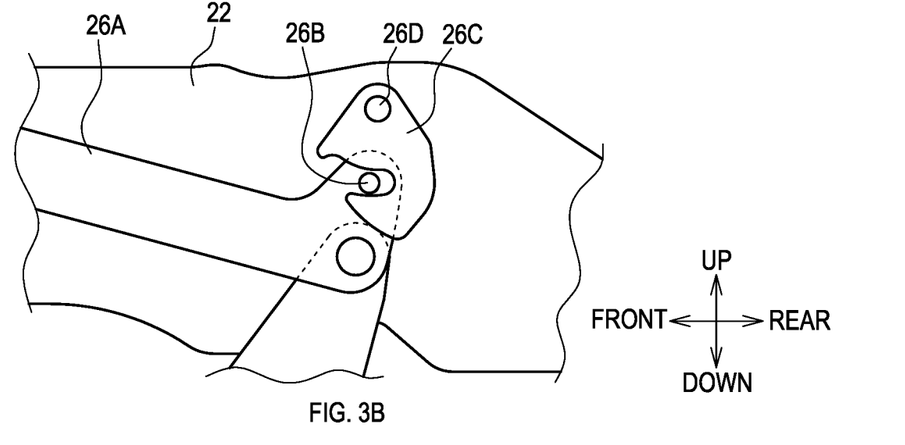
FIG. 3B is a schematic diagram illustrating a state where the driving link in the seat in FIG. 2 is unlocked.
Figure 3C:
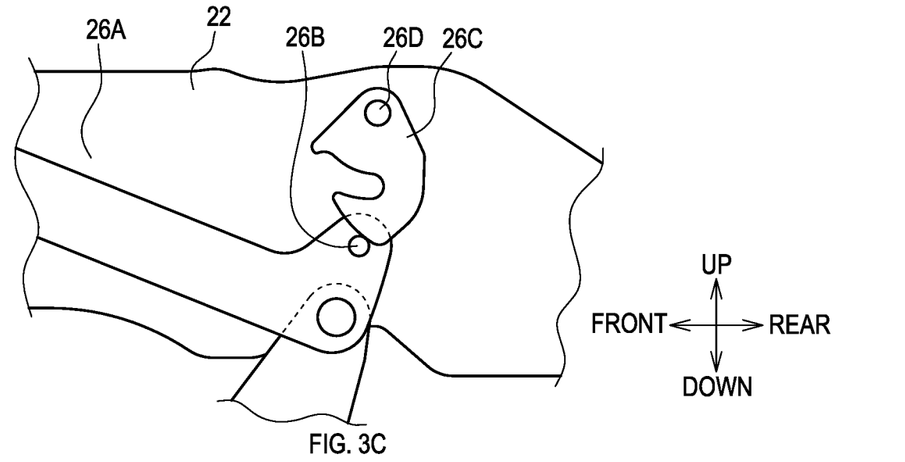
FIG. 3C is a schematic diagram illustrating a state where a seat body of the seat in FIG. 2 is raised.

The locking member 26C moves to a first position illustrated in FIG. 3A, and to a second position illustrated in FIG. 3B, where the locking member 26C is pivoted frontward of the first position. The locking member 26C pivots about the shaft 26D coupled to the cushion frame 22 in the direction of the seat front-rear axis. The locking member 26C is biased from the first position toward the second position by use of, for example, an elastic element, such as a spring.

The locking member 26C that is positioned at the first position does not engage with the pin 26B. The locking member 26C that is positioned at the second position, as shown in FIG. 3B, engages with the pin 26B when the cushion frame 22 is positioned at a height enabling locking. On the other hand, when the cushion frame 22 is moved upper than the height enabling locking in response to rotation of the driving link 26A, as shown in FIG. 3C, the pin 26B is positioned lower than the locking member 26C, and thus the locking member 26C that is positioned at the second position does not engage with the pin 26B.

The seat lifter device 26 moves the locking member 26C between the first position and the second position by using an actuator for locking driven by electric, pneumatic, hydraulic, or another energy. The seat lifter device 26 rotates the driving link 26A by using an actuator for driving driven by electric, pneumatic, hydraulic, or another energy.

<Boarding/Deboarding Controller>

The boarding/deboarding controller 1 is configured to control a movement of the canopy 40 and a change in posture and position of the seat 20.

The boarding/deboarding controller 1 is configured, for example, by a microcomputer including a microprocessor, a storage medium such as a RAM and a ROM, and an input/output portion. The boarding/deboarding controller 1 executes a program previously stored to control the canopy 40 and the seat 20. The boarding/deboarding controller 1 may be included in an electronic control unit (ECU) mounted on the vehicle 10.

The boarding/deboarding controller 1 executes a first process when the user deboards the vehicle 10, a second process when the user boards the vehicle 10, and a third process when closing the canopy 40 without having the user board the vehicle 10.

(First Process)

The first process is performed on the vehicle 10 in which the canopy 40 positioned at the closed position. In the first process, the canopy 40 is moved to the opened position, and the seat 20 the user is sitting on is moved from the driving position to a boarding/deboarding position. The first process is, specifically, for altering the vehicle 10 to a state in which the user in the occupant compartment 30 is able to deboard the vehicle 10.

The boarding/deboarding controller 1 executes the first process in response to the user's input to an input section provided on a key of the vehicle 10 or the occupant compartment 30. In the first process, the boarding/deboarding controller 1 changes the posture or position of the seat 20 concurrently while the canopy 40 is moved from the closed position to the opened position in the opened movement.

Figure 4:
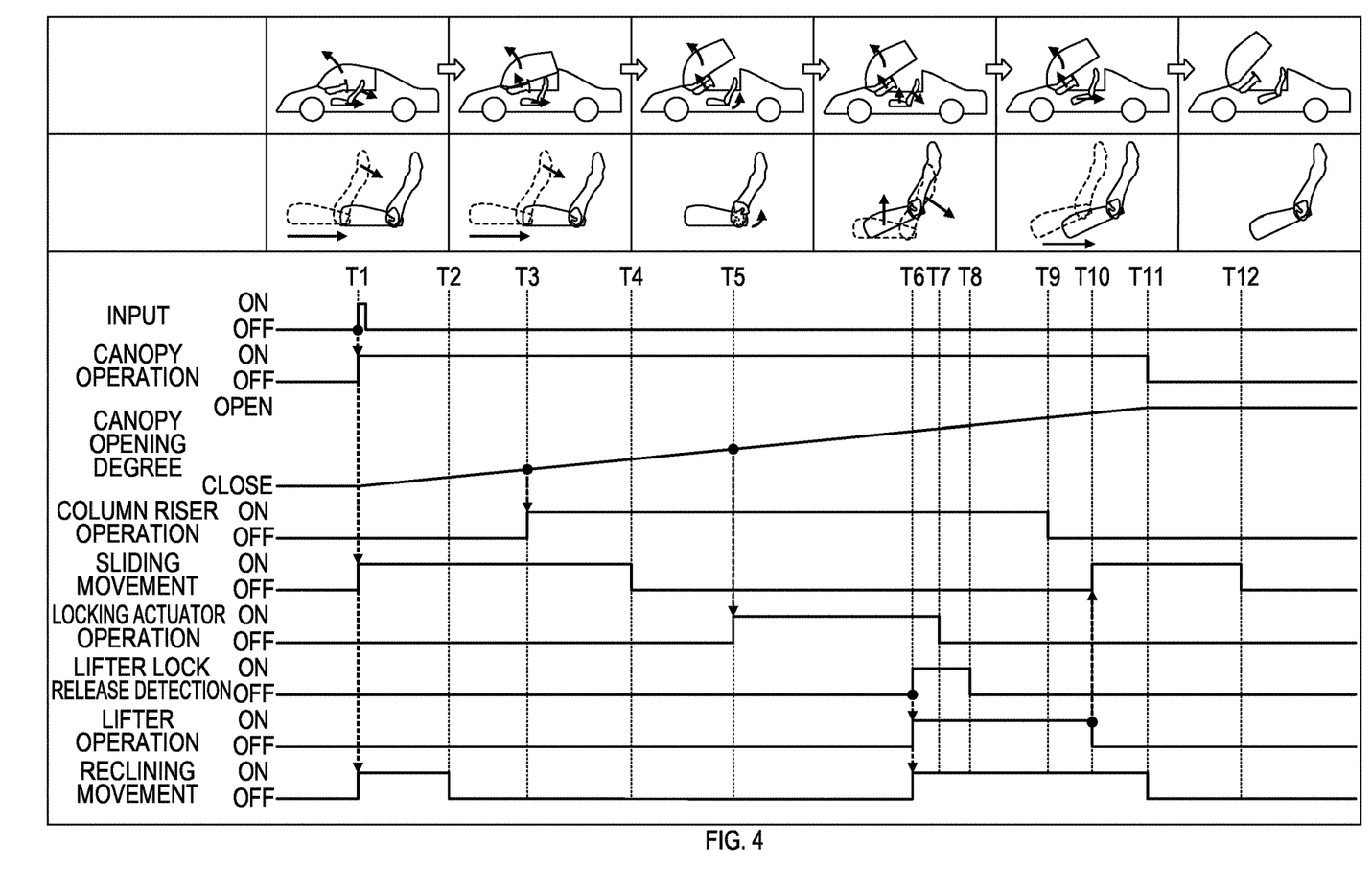
FIG. 4 is a time chart illustrating a first process control by a boarding/deboarding controller in FIG. 1A.

As illustrated in FIG. 4, the boarding/deboarding controller 1 moves the canopy 40 toward the opened position upon receiving the user's input at time T1. Also, at the time T1, the boarding/deboarding controller 1 slides the seat body 21, which is located at the driving position, rearward and simultaneously reclines the seatback 21B rearward.

In other words, the boarding/deboarding controller 1 pivots the seatback 21B by using the reclining device 24 and slides the seat body 21 by using the sliding device 25 concurrently while performing the opened movement of the canopy 40. The reclining movement is completed at time T2. The sliding movement is completed at time T4.

The boarding/deboarding controller 1 raises the steering column 50 when the canopy 40 reaches a predetermined first opening degree (at time T3, namely). The column riser for moving the steering column 50 stops at time T9.

The boarding/deboarding controller 1 drives the seat lifter device 26 so that the seat body 21 is raised when the canopy 40 reaches a predetermined second opening degree (at time T5, namely). In other words, the boarding/deboarding controller 1 raises the seat body 21 by using the seat lifter device 26 concurrently while performing the opened movement of the canopy 40. At the second opening degree, the canopy 40 is closer to the opened position than being at the first opening degree (in other words, the canopy 40 is positioned upper than being at the first opening degree).

Specifically, the boarding/deboarding controller 1 moves the locking member 26C of the seat lifter device 26 from the second position to the first position by using the actuator for locking at the time T5. When a release of the locking member 26C (that is, the movement to the first position) is detected at time T6, the boarding/deboarding controller 1 raises the seat body 21 by rotating the driving link 26A.

The release of the locking member 26C is detected by, for example, a limit switch. The actuator for locking, which moves the locking member 26C is driven until time T7 after the detection. The locking member 26C, at time T8 when the actuator for locking stops, is biased and moved from the first position to the second position, but does not engage with the pin 26B.

The boarding/deboarding controller 1 pivots the seatback 21B rearward again by using the reclining device 24 at the time T6. Specifically, the boarding/deboarding controller 1 drives the seat lifter device 26 so as to raise the seat body 21, and simultaneously drives the reclining device 24 so as to pivot the seatback 21B in a rearward direction, while the canopy 40 is in the opened movement.

The boarding/deboarding controller 1 slides the seat body 21 rearward again by using the sliding device 25 at the same time that the seat body 21 is raised to the boarding/deboarding position at time T10.

At time T11, the opened movement is completed as the canopy 40 reaches the opened position, and a second reclining movement is completed. At time T12, a second sliding movement is completed. Consequently, the canopy 40 is moved to the opened position, and the seat 20 is moved to the boarding/deboarding position. Then the first process is terminated.

(Second Process)

The second process is performed on the vehicle 10 in which the canopy 40 is positioned at the opened position. In the second process, the canopy 40 is moved to the closed position, and the seat 20 the user is sitting on is moved from the boarding/deboarding position to the driving position. The second process is, specifically, for altering the vehicle 10 to a state in which the user on board inside of the occupant compartment 30 is able to drive the vehicle 10.

The boarding/deboarding controller 1 executes the second process in response to the user's input to an input section provided on the key of the vehicle 10 or the occupant compartment 30. In the second process, the boarding/deboarding controller 1 changes the posture or position of the seat 20 concurrently while the canopy 40 is moved from the opened position to the closed position in the closed movement.

Figure 5:
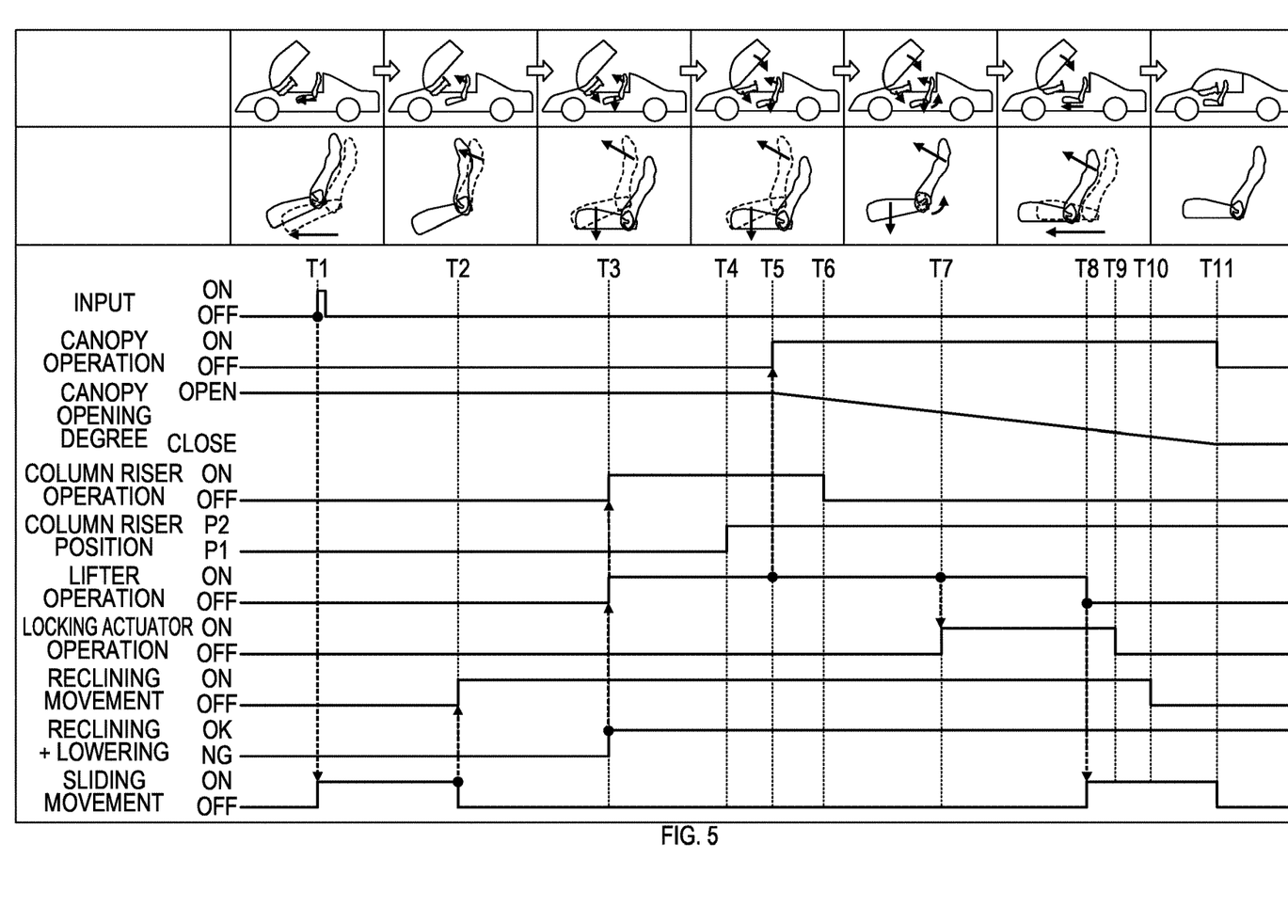
FIG. 5 is a time chart illustrating a second process control by the boarding/deboarding controller in FIG. 1A.

As illustrated in FIG. 5, the boarding/deboarding controller 1 slides the seat body 21, which is located at the boarding/deboarding position, forward upon receiving the user's input at the time T1. Subsequently, at the time T2, the boarding/deboarding controller 1 stops sliding the seat body 21 and simultaneously raises the seatback 21B forward.

A position of the seat body 21 and a tilt of the seatback 21B each reach a predetermined range (that is, a state in which reclining and lowering can be simultaneously performed with respect to the seat body 21) at the time T3. The boarding/deboarding controller 1, at the time T3, lowers the seat body 21 by using the seat lifter device 26 and simultaneously lowers the steering column 50 from a boarding/deboarding position P1 toward a driving position P2. The steering column 50 reaches the driving position P2 at the time T4. The column riser stops at the time T6.

At the time T5 when a certain time period has elapsed after the seat lifter device 26 starts to be driven, the boarding/deboarding controller 1 moves the canopy 40 toward the closed position. Specifically, the boarding/deboarding controller 1 drives the seat lifter device 26 so as to lower the seat body 21, and commands the closed movement of the canopy 40 when the seat body 21 reaches a predetermined height. A height of the seat body 21 can be detected, for example, by a limit switch or from a rotation speed of the actuator of the seat lifter device 26.

The boarding/deboarding controller 1 keeps driving the seat lifter device 26 even after starting to move the canopy 40. Specifically, the boarding/deboarding controller 1 lowers the seat body 21 by using the seat lifter device 26 concurrently while the canopy 40 is in the closed movement. The boarding/deboarding controller 1, at the time T7, moves the locking member 26C of the seat lifter device 26 to the first position by using the actuator for locking, and retains the locking member 26C at the first position until the time T9.

The boarding/deboarding controller 1 stops the seat lifter device 26 when the seat body 21 reaches a height of the driving position (that is, the height enabling locking) at the time T8, namely, and simultaneously slides the seat body 21 forward. The boarding/deboarding controller 1, at the time T9, releases the retainment of the locking member 26C at the first position, and moves the locking member 26C to the second position. Consequently, the seat lifter device 26 is locked.

After the seat lifter device 26 is locked, the reclining that has been performed from the time T2 is completed at the time T10. Subsequently, at the time T11, the closed movement is completed as the canopy 40 reaches the closed position, and the second sliding movement is completed.

In other words, the boarding/deboarding controller 1 pivots the seatback 21B by using the reclining device 24 and slides the seat body 21 by using the sliding device 25 concurrently while performing the closed movement of the canopy 40.

With the above-described procedure, the canopy 40 is moved to the closed position and the seat 20 is moved to the driving position. Then the second process is terminated. The driving position to which the seat 20 is moved is a driving position after the first process is executed. In other words, the driving position before the user deboards the vehicle 10 is restored through the second process. Thus, the effort by the user to return the seat 20 to the driving position can be omitted.

(Third Process)

The third process is performed on the vehicle 10 in which the canopy 40 is positioned at the opened position. In the third process, the canopy 40 is moved to the closed position, and the seat 20 the user is not sitting on is moved from the boarding/deboarding position to a storage position. The third process is, specifically, for closing the canopy 40 after the user deboards the vehicle 10 via the seat 20 already moved to the boarding/deboarding position through the first process.

The boarding/deboarding controller 1 executes the third process in response to the user's input to an input section provided on the key of the vehicle 10 or the occupant compartment 30, or to an input section provided on an outer surface of the body 11. In the third process, the boarding/deboarding controller 1 changes the posture or position of the seat 20 concurrently while the canopy 40 is moved from the opened position to the closed position in the closed movement.

The boarding/deboarding controller 1 detects a presence or absence of the user sitting on the seat 20 when the closed movement of the canopy 40 is inputted, and determines whether to execute the second process or the third process. The presence or absence of the user sitting on the seat 20 can be detected, for example, by a load sensor.

Figure 6:
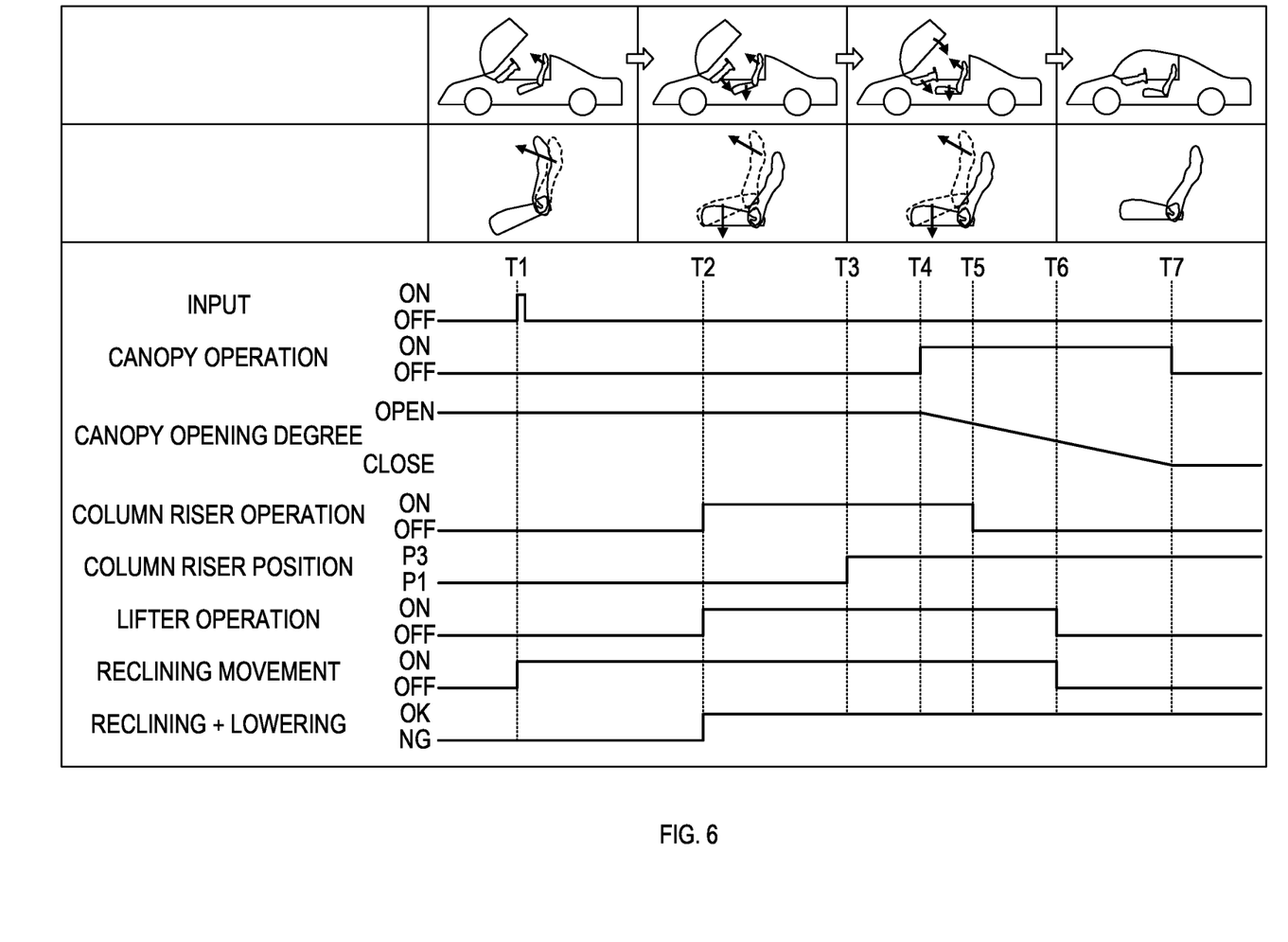
FIG. 6 is a time chart illustrating a third process control by the boarding/deboarding controller in FIG. 1A.

As illustrated in FIG. 6, the boarding/deboarding controller 1 raises the seatback 21B forward upon receiving the user's input at the time T1. The position of the seat body 21 and the tilt of the seatback 21B each reach the predetermined range (that is, a state in which reclining and lowering can be simultaneously performed with respect to the seat body 21) at the time T2. The boarding/deboarding controller 1, at the time T2, lowers the seat body 21 and simultaneously lowers the steering column 50 from the boarding/deboarding position P1 toward a storage position P3.

The steering column 50 reaches the storage position P3 at the time T3, then the boarding/deboarding controller 1 moves the canopy 40 toward the closed position at the time T4. The column riser stops at the time T5.

The boarding/deboarding controller 1 simultaneously stops the seat lifter device 26 and the reclining device 24 when the seat body 21 reaches the height of the driving position (at the time T6, namely). Subsequently, the closed movement is completed as the canopy 40 reaches the closed position at the time T7.

In the third process, the sliding movement of the seat body 21 is not performed, and the seat 20 is not restored to the driving position. Accordingly, a processing time for the third process is reduced compared to the second process. When the boarding/deboarding controller 1 executes the first process after the third process, the sliding movement in the first process, and a first reclining movement that is started at the time T1 illustrated in FIG. 4 are omitted.

1-2. Effects

According to the above-detailed embodiment, the following effects can be obtained.

(1a) When the user deboards the vehicle 10 or the user boards the vehicle 10, the canopy 40 and the seat 20 can be moved to positions where the user easily boards or deboards in a single operation. The movement of the canopy 40 and the change in posture or position of the seat 20 are concurrently performed, whereby the time for boarding or deboarding can be reduced.

(1b) The seat body 21 is raised and lowered with the use of the seat lifter device 26 concurrently while the movement of the canopy 40 is performed, whereby the seat body 21 can be raised to a height where the user easily boards or deboards.

(1c) The seat body 21 is raised when the canopy 40 reaches the predetermined opening degree while the canopy 40 is in the opened movement, whereby the opened movement of the canopy 40 and a rise of the seat body 21 can be concurrently performed, while an interference between the canopy 40 and the seat 20 and a collision between the canopy 40 and the user are suppressed.

(1d) The closed movement of the canopy 40 is commanded when the seat body 21 as being lowered reaches the predetermined height, whereby the closed movement of the canopy 40 and a lowering of the seat body 21 can be concurrently performed, while an interference between the canopy 40 and the seat 20 and a collision between the canopy 40 and the user are suppressed.

(1e) The seatback 21B is pivoted with the use of the reclining device 24 concurrently while the movement of the canopy 40 is performed, whereby the tilt of the seatback 21B can be changed while the height of the seat 20 is changed. Thus, a cramped posture of the user sitting on the seat 20 can be inhibited.

(1f) While the canopy 40 is in the opened movement, the seatback 21B is pivoted in the rearward direction at the same time that the seat body 21 is raised, thereby allowing a distance between a head of the user sitting on the seat 20 and the canopy 40. Consequently, an oppressive feeling on the user can be reduced.

(1g) The seat body 21 is slid with the use of the sliding device 25 concurrently while the movement of the canopy 40 is performed, whereby the seat body 21 can be moved to a position where the user easily boards or deboards.

2. Other Embodiments

The embodiment of the present disclosure has been described. However, the present disclosure should not be limited by the aforementioned embodiment, and can be practiced in various manners.

(2a) The boarding/deboarding controller 1 according to the aforementioned embodiment does not necessarily drive the reclining device 24, the sliding device 25, and the seat lifter device 26 concurrently while the canopy 40 is in the opened movement or the closed movement. For example, the boarding/deboarding controller 1 may drive only the seat lifter device 26 concurrently while performing the opened movement or the closed movement.

(2b) The boarding/deboarding controller 1 according to the aforementioned embodiment may only execute at least one of the first process or the second process. For example, the boarding/deboarding controller 1 may execute a process for moving the canopy 40 after changing the posture or position of the seat 20, instead of executing the second process.

(2c) The boarding/deboarding controller 1 according to the aforementioned embodiment can be applied to a vehicle other than an automobile, such as a railroad vehicle, a ship, or an aircraft.

(2d) Functions of one component in the aforementioned embodiments may be distributed to two or more components. Functions of two or more components may be integrated and achieved by one component. A part of the configurations of the aforementioned embodiments may be omitted. At least a part of the configurations of aforementioned embodiments may be added to or replaced with other configurations of another one of the aforementioned embodiments. Any and all modes that are encompassed in the technical ideas identified by the languages in the claims are embodiments of the present disclosure.

What is claimed is:

1. A boarding/deboarding control circuit for a vehicle, the vehicle including a seat, an occupant compartment, and a canopy, the occupant compartment including (i) an opening at least at a top of the occupant compartment and (ii) the seat inside the occupant compartment, the canopy being configured to move between a closed position and an opened position, the closed position being a position where the canopy closes the opening of the occupant compartment, the opened position being upper than the closed position,
    wherein the seat includes:
        a seat body including a seat cushion and a seatback;
        a pin and a locking member;
        a seat lifter actuator configured to move a rear of the seat cushion along an up-down axis by moving the locking member to be engaged with and released from the pin; and
        a reclining actuator configured to pivot the seatback in a direction of a seat front-rear axis relative to the seat cushion,
    wherein the boarding/deboarding control circuit is configured (i) to drive the seat lifter actuator to raise the rear of the seat cushion such that the rear of the seat cushion becomes higher than a front of the seat cushion during an opened movement of the canopy from the closed position to the opened position and (ii) to simultaneously drive the reclining actuator to pivot the seatback in a rearward direction during the opened movement of the canopy,
    wherein the boarding/deboarding control circuit is configured to drive the seat lifter actuator to start moving the locking member to be released from the pin when the canopy reaches a predetermined opening degree during the opened movement of the canopy, and
    wherein, when a release of the locking member is detected after the canopy reaches the predetermined opening degree, the boarding/deboarding control circuit is configured to drive the seat lifter actuator to start raising the seat cushion and simultaneously drive the reclining actuator to start pivoting the seatback in the rearward direction.

2. The boarding/deboarding control circuit according to claim 1,
    wherein the boarding/deboarding control circuit is configured to drive the seat lifter actuator to lower the rear of the seat cushion in association with a closed movement of the canopy from the opened position to the closed position.

3. The boarding/deboarding control circuit according to claim 2,
    wherein the boarding/deboarding control circuit is configured (i) to drive the seat lifter actuator to lower the rear of the seat cushion, and (ii) to command the closed movement of the canopy when the seat cushion reaches a predetermined height.

4. The boarding/deboarding control circuit according to claim 1,
    wherein the boarding/deboarding control circuit is configured to drive the reclining actuator to pivot the seatback in a forward direction in association with a closed movement of the canopy from the opened position to the closed position.

5. The boarding/deboarding control circuit according to claim 1,
    wherein the seat includes a sliding actuator configured to slide the seat body along a seat front-rear axis, and
    wherein the boarding/deboarding control circuit is configured to drive the sliding actuator to slide the seat body in association with (i) the opened movement of the canopy or (ii) a closed movement of the canopy from the opened position to the closed position.

6. A boarding/deboarding control circuit for a vehicle, the vehicle including a seat, an occupant compartment, and a canopy, the occupant compartment including (i) an opening at least at a top of the occupant compartment, (ii) the seat inside the occupant compartment and (iii) a steering column inside the occupant compartment, the canopy being configured to move between a closed position and an opened position, the closed position being a position where the canopy closes the opening of the occupant compartment, the opened position being upper than the closed position,
    wherein the seat includes:
        a seat body including a seat cushion and a seatback;
        a pin and a locking member;
        a seat lifter actuator configured to move a rear of the seat cushion along an up-down axis by moving the locking member to be engaged with and released from the pin; and
        a reclining actuator configured to pivot the seatback in a direction of a seat front-rear axis relative to the seat cushion,
    wherein the boarding/deboarding control circuit is configured to start raising the steering column when the canopy reaches a first opening degree during an opened movement of the canopy from the closed position to the opened position,
    wherein, after the steering column started being raised during the opened movement of the canopy from the closed position to the opened position, the boarding/deboarding control circuit is configured (i) to drive the seat lifter actuator to raise the rear of the seat cushion such that the rear of the seat cushion becomes higher than a front of the seat cushion and (ii) to simultaneously drive the reclining actuator to pivot the seatback in a rearward direction, wherein the boarding/deboarding control circuit is configured to drive the seat lifter actuator to start moving the locking member to be released from the pin when the canopy reaches a second opening degree during the opened movement of the canopy, and wherein, when a release of the locking member is detected after the canopy reaches the second opening degree, the boarding/deboarding control circuit is configured to drive the seat lifter actuator to start raising the seat cushion and simultaneously drive the reclining actuator to start pivoting the seatback in the rearward direction.

7. The boarding/deboarding control circuit according to claim 6, wherein the boarding/deboarding control circuit is configured to continue moving the steering column after the boarding/deboarding control circuit drives the seat lifter actuator to raise the rear of the seat cushion such that the rear of the seat cushion becomes higher than the front of the seat cushion and simultaneously drives the reclining actuator to pivot the seatback in the rearward direction.

* * * * *